US011807913B2

(12) United States Patent
Ebner et al.

(10) Patent No.: US 11,807,913 B2
(45) Date of Patent: Nov. 7, 2023

(54) PORTABLE CARRIER DEVICE FOR A FURNACE CHARGE AND HANDLING SYSTEM FOR THE CARRIER DEVICE

(71) Applicant: EBNER INDUSTRIEOFENBAU GMBH, Leonding (AT)

(72) Inventors: Robert Ebner, Leonding (AT); Günter Grillberger, Ottensheim (AT); Peter Ladner, Hellmonsödt (AT); Martin Lauber, Linz (AT)

(73) Assignee: Ebner Industrieofenbau GmbH, Leonding (AT)

( * ) Notice: Subject to any disclaimer, the term of this patent is extended or adjusted under 35 U.S.C. 154(b) by 369 days.

(21) Appl. No.: 16/648,977

(22) PCT Filed: Sep. 20, 2018

(86) PCT No.: PCT/EP2018/075513
§ 371 (c)(1),
(2) Date: Mar. 19, 2020

(87) PCT Pub. No.: WO2019/057837
PCT Pub. Date: Mar. 28, 2019

(65) Prior Publication Data

US 2020/0291500 A1 Sep. 17, 2020

(30) Foreign Application Priority Data

Sep. 20, 2017 (DE) ..................... 10 2017 121 830.0
Oct. 30, 2017 (AT) .............................. A 50905/2017

(51) Int. Cl.
*C21D 9/675* (2006.01)
*F27D 3/00* (2006.01)
(Continued)

(52) U.S. Cl.
CPC ............. *C21D 9/675* (2013.01); *C21D 9/663* (2013.01); *F27D 3/0024* (2013.01); *F27D 3/06* (2013.01);
(Continued)

(58) Field of Classification Search
CPC . C21D 5/06; C21D 9/54; C21D 9/663; C21D 9/675; F27B 11/00; F27D 3/0024;
(Continued)

(56) References Cited

U.S. PATENT DOCUMENTS 1,876,960 A 9/1932 Kenworthy
4,020,960 A * 5/1977 Louis ..................... B60P 1/483 414/458
(Continued)

FOREIGN PATENT DOCUMENTS

DE 1 271 736 7/1968
DE 25 42 083 B1 3/1976
(Continued)

OTHER PUBLICATIONS

IT 1125476 B—Translation (Year: 1986).*
Internationai Search Report with Written Opinion, corresponding to PCT/EP2018/075513, dated Sep. 20, 2018, 17 pages.

*Primary Examiner* — Steven B McAllister
*Assistant Examiner* — Benjamin W Johnson
(74) *Attorney, Agent, or Firm* — Lewis Roca Rothgerber Christie LLP

(57) ABSTRACT

The present invention relates to a device for carrying component parts to be temperature-controlled, in particular coiled metal strips or metal wires, in a temperature-control device. The carrier device has a base body and a carrier element, to which a component part is attachable, wherein the carrier element is detachably attached to the base body. The base body has a transport coupling, which is configured
(Continued)

such that the transport coupling is detachably fixable to a handling system for handling the device.

16 Claims, 11 Drawing Sheets

(51) Int. Cl.

| | |
|---|---|
| ***F27D 3/12*** | (2006.01) |
| ***F27D 19/00*** | (2006.01) |
| ***F27D 21/00*** | (2006.01) |
| ***F27D 3/06*** | (2006.01) |
| ***C21D 9/663*** | (2006.01) |
| *F27D 5/00* | (2006.01) |
| *F27B 11/00* | (2006.01) |
| *C21D 5/06* | (2006.01) |
| *C21D 9/54* | (2006.01) |
| *F27D 3/02* | (2006.01) |

(52) U.S. Cl.

CPC ............... *F27D 3/12* (2013.01); *F27D 19/00* (2013.01); *F27D 21/0014* (2013.01); *C21D 5/06* (2013.01); *C21D 9/54* (2013.01); *F27B 11/00* (2013.01); *F27D 3/02* (2013.01); *F27D 5/00* (2013.01); *F27D 2003/0059* (2013.01); *F27D 2003/0065* (2013.01); *F27D 2003/125* (2013.01); *F27D 2019/0003* (2013.01)

(58) Field of Classification Search

CPC ..... F27D 3/02; F27D 3/06; F27D 3/12; F27D 5/00; F27D 19/00; F27D 21/0014; F27D 2003/0059; F27D 2003/0065; F27D 2003/125; F27D 209/0003

USPC ............................................. 439/49; 432/49

See application file for complete search history.

(56) References Cited

U.S. PATENT DOCUMENTS

| | | | | |
|---|---|---|---|---|
| 4,858,893 | A | 8/1989 | Beuret et al. | |
| 5,098,251 | A * | 3/1992 | Kress | B60P 1/483 414/458 |
| 5,402,994 | A | 4/1995 | Egger | |
| 5,756,043 | A | 5/1998 | Coble | |
| 6,318,571 | B1 | 11/2001 | Maumus et al. | |
| 6,346,214 | B1 | 2/2002 | Knudsen et al. | |
| 6,555,049 | B1 * | 4/2003 | Kress | F27D 3/12 266/143 |
| 2006/0043653 | A1 | 3/2006 | Chretien | |

FOREIGN PATENT DOCUMENTS

| | | | | |
|---|---|---|---|---|
| DE | 24 56 982 | A1 | 6/1976 | |
| DE | 29 24 270 | A1 | 12/1980 | |
| DE | 198 47 417 | A1 | 4/2000 | |
| DE | 100 16 096 | A1 | 9/2001 | |
| DE | 201 13 919 | U1 | 1/2002 | |
| DE | 698 10 662 | T2 | 11/2003 | |
| DE | 10 2009 026 624 | A1 | 4/2011 | |
| DE | 10 2011 014 636 | A1 | 9/2012 | |
| EP | 2 610 356 | A2 | 7/2013 | |
| EP | 2 995 894 | A1 | 3/2016 | |
| GB | 1 550 344 | | 8/1979 | |
| IT | 1125476 | B * | 5/1986 | F27D 3/123 |

* cited by examiner

PORTABLE CARRIER DEVICE FOR A FURNACE CHARGE AND HANDLING SYSTEM FOR THE CARRIER DEVICE

REFERENCE TO RELATED APPLICATIONS

The present application is a national phase application derived from the international patent application no. PCT/EP2018/075513, filed Sep. 20, 2018, which in turn claims the benefits of the filing dates of the German patent application no. DE 10 2017 121 830.0, filed Sep. 20, 2017 and of the Austrian patent application no. AT A50905/2017, filed Oct. 30, 2017, all of which are incorporated herein by reference in their entireties.

TECHNICAL FIELD

The present invention relates to a device for carrying component parts to be temperature-controlled, in particular sheet metal rolls or wire rolls, and a handling system and/or a method for handling a functional device of a temperature-control device.

BACKGROUND OF THE INVENTION

In stationary industrial furnaces, such as for example hood-type furnaces, a base of the hood-type furnace is first loaded with a charge (or batch) of component parts to be heated. Subsequently, a corresponding furnace hood is put over the charge, so that the furnace hood together with the base forms an annealing chamber. The annealing chamber can subsequently be set to an appropriate temperature, so that the charge can be heat-treated.

Several different furnace hoods (e.g. protective hood, warming hood, heating hood, cooling hood etc.) can be placed on the base. Thus, for example, a protective hood can initially seal the annealing chamber in order to constitute, for example, a protective gas atmosphere in the annealing chamber. Furthermore, a furnace hood can be configured as a cooling hood to cool the charge. Different furnace hoods can be slipped (or put) over the protective hood, so that, for example, interspaces occur between two furnace hoods, into which interspaces a particular heating medium or cooling medium can be introduced.

The furnace hoods are lifted by a manually controlled crane and are lowered onto the base or to their storing place. The furnace hoods must be placed on the base extremely precisely. Furthermore, the furnace hoods have to be aligned centeredly to each other. This requires a high degree of accuracy and results in that the placement of the furnace hoods takes a long time.

During the placing of the charge on the base and during the superimposing of the furnace hoods, no further charge can be heat-treated. Such a long set-up time reduces the effectiveness of the hood-type furnace.

The component parts to be heat-treated are fixed, for example, to so-called headstocks (or crown supports). The headstocks are formed columnarly (or in the form of columns), for example. Coils (metal strip coils or wire coils) as the component part to be heated can be slipped over the headstocks. A plurality of headstocks can thus be placed on the base of the hood-type furnace by a manually controlled crane and together form a charge (or batch). During the placing of the individual headstocks, no operation of the hood-type furnace is possible, so that again a long set-up time is required.

PRESENTATION OF THE INVENTION

There may be a need to reduce the set-up time of a hood-type furnace and thus to increase the efficiency of a hood-type furnace.

According to exemplary embodiments of the invention, there is established a device for carrying component parts to be temperature-controlled, a handling system for handling a functional device of a temperature-control device, as well as a method for handling a functional device of a temperature-control device according to the independent patent claims.

According to a first aspect of the present invention, there is described a device for carrying component parts to be temperature-controlled, in particular rolled metal strips or metal wires (so-called coils), in a temperature-control device. The carrier device has a base body and a carrier element, to which a component part can be attached. The carrier element is detachably attached to the base body. The base body has a transport coupling, which is configured such that the transport coupling is detachably fixable to a handling system for handling the carrier device.

According to a further aspect of the present invention, there is described a handling system for handling a functional device of a temperature control device. The handling system has a transport device. The transport device has a base frame, which is transportable along a ground, and an attachment device, which is coupled to the base frame. The attachment device is configured to selectively attach the functional device to the base frame, wherein the base frame is configured such that the base frame is transportable for a transport of the functional device between a set-up location, at which the functional device is selectively attachable to the base frame, and a temperature-control location in the temperature-control device.

According to a further aspect of the present invention, there is described a method for handling a functional device of a temperature control apparatus. The method has providing a transport device having a base frame that is transportable along a ground and an attachment device that is coupled to the base frame. The method further has attaching the functional device selectively to the base frame by the attachment means. The method further has transporting the functional device by the base frame between a set-up location, at which the functional device is selectively attached to the base frame, and a temperature-control location in the temperature-control device.

The temperature-control device may describe a device, which may temperature-control (or temper) component parts to be temperature-controlled, i.e. may heat or cool the component parts. In particular, the temperature control device described herein may be a stationary furnace, such as for example a hood-type furnace. A hood-type furnace, for example, may set a component part to a predetermined temperature and heat-treat it.

A functional device may describe, for example, a device for carrying component parts to be temperature-controlled, such as the above described device according to the invention. Furthermore, a functional device may also be understood to be a guide cylinder or a furnace hood, which may, for example, be placed on a base of the temperature-control device. In a hood-type furnace, for example, several different furnace hoods may be placed on top of each other in a nested manner. For example, a furnace hood having a larger diameter may be placed over a furnace hood having a smaller diameter so that the smaller furnace hood may be located in the larger furnace hood. The innermost furnace hood may act as a protective hood, for example, so that a protective gas atmosphere may be formed in an inner annealing chamber. A further furnace hood, such as a warming hood and heating hood or a cooling hood, may be slipped (or put) over the protective hood. A heating hood may weigh, for example, between 20,000 kg (kilograms) and 25,000 kg. A cooling hood may weigh, for example, between 8,000 kg and 12,000 kg. A furnace hood may have, for example, a height between 4 m and 8 m (meters). A furnace hood may have, for example, a diameter between 4 m and 6 m.

In the described temperature-control device and/or hood furnace, different component parts, in particular metallic component parts, may be heat treated with a predetermined temperature-control curve. The component parts may consist, for example, of metal strips or metal wires. The metal strips or metal wires may be available in a coiled up manner in the form of a coil, and thus may achieve a better stacking.

A unit of component parts, which may be temperature-controllable in the temperature-control device in one temperature-control process is called a charge (or batch).

The device according to the invention described above may have one or a plurality of carrier elements. A carrier element may serve to attach the component part to the base body of the device. The carrier element may be configured, for example, as described below, columnarly (or in the form of a column) as a so-called head stock (or crown stock). For example, up to 14 or more carrier elements may be placed on the base body. The carrier element may be detachably attached to the base body, or may stand loosely on the base body. For example, the carrier element may be attached to the base body by a detachable snap-in connection or a clamp connection. One or a plurality of component parts may be attached to the carrier element. Thus, the carrier element may be equipped with the component parts distant from the base body and may subsequently be placed on the base body. Alternatively, the carrier element may be placed on the base body and may then be equipped with the component parts.

The base body may serve to support the carrier elements on the one hand and to transport them on the other hand. For example, a roller device may be arranged at the base body in order to convey and transport the base body above the ground. Alternatively, the base body may also be transportable or movable by rail transport. The base body may be, for example, configured as a frame-like structure consisting of rigidly connected steel beams (or steel girders). The device and its component parts may be embodied, for example, such that the device may be placeable as a whole on a base of the temperature-control device and may undergo the entire heat treatment of the component parts in the temperature-control device.

Furthermore, the base body may have a transport coupling to which a handling system, such as for example a crane or a handling system according to the invention and as described above may be detachably fixed. Thus, the device may be transported between a set-up location, where the base body may be equipped with the carrier elements and/or the component parts, and the temperature-control device. The transport coupling may enable a crane hook or an attachment device of the handling system to be coupleable.

The device together with the carrier elements and the component parts thus may define a charging unit, which may be inserted into the temperature-control device. In addition, a charging unit may also consist of the required furnace hoods. With the device according to the invention and as described above, the entire device may thus be equipped with the component parts to be temperature-controlled at a set-up location at a distance from the temperature-control device without having to interrupt a temperature-control process in the temperature-control device. Furthermore, the temperature-control device may be quickly and completely equipped with a charging unit without long set-up times being necessary. Thereby, the efficiency of a temperature control unit may be increased, because the set-up times may be greatly minimized due to the device being equipped outside of the temperature-control device.

Furthermore, the device may be quickly transported between the set-up location and the temperature-control device using the handling system according to the invention. The handling system may have in particular a corresponding transport device having a base frame and an attachment device. A functional device, such as the transport coupling of the device described above or a furnace hood, may be selectively attached to the attachment device. The base frame may have, for example, transport elements, such as for example roller elements, in order to be transportable along the ground.

With the above-described device for carrying component parts to be temperature-controlled and with the handling system, a possibility may thus be established to quickly fit (or load) a temperature-control device, especially a hood furnace, so that the set-up times may be significantly reduced.

Further exemplary embodiments of the above-described device for carrying component parts to be temperature-controlled are described in the following.

According to a further exemplary embodiment, the carrier element may form a carrier column (so-called headstock, or crown stock), wherein the carrier column may be configured such that the component part may be pluggable (or slippable) over the column. In particular, if the component part is in the form of a coiled metal strip or metal wire, several component parts may be attached or plugged onto a carrier column one above the other. A supporting element or a supporting platform may be provided between the component parts or between a group of component parts, which may be pluggable (or attachable) to a carrier column in order to reduce the weight load of the component parts below. The supporting element may be connected to the carrier column in order to transfer the weight force of the component parts that may rest on the supporting element via the carrier column into the base body.

According to a further exemplary embodiment, the carrier column may have a carrier tube onto which the component part may be pluggable via the carrier column, and a carrier beam. The carrier beam may be insertable and lockable into the carrier tube, wherein the carrier beam may have a transport section for coupling to a transport device.

According to a further exemplary embodiment, the base body may have a bottom section, which may be placeable on a ground. The base body may be configured such that a weight force of the component part may be introducible via the base body into the ground. The base body thus may form a ground platform. The base body may also be placed on a transport device, for example, to move the device along the ground.

According to a further exemplary embodiment, the carrier element may be hangable (or suspendable) to the base body for detachable fastening, so that the carrier element may extend from the base body in the direction towards the ground. For example, in this embodiment example, the carrier element may stand on the ground and/or on the base of the temperature-control device, so that the weight force may be introduced via the carrier element into the ground. The base body, to which the carrier elements may be suspended or attached, may be arranged at a distance from the ground. The base body thus may connect the carrier elements, so that a handling system, such as for example a crane, may grip the base body at its transport coupling and may transport the entire device to a desired location.

According to a further exemplary embodiment, the base body may have a receiving section, wherein the carrier element may have an attachment element, which may be configured such that the attachment element may be selectively attachable to the receiving section. Various attachment elements may be provided or corresponding recesses may be formed in the receiving section in order to selectively enable a coupling with the carrier element.

According to a further exemplary embodiment, the receiving section may have a receiving rail and/or a receiving eyelet. The carrier element may have a gripping element, which may be selectively attachable to the base body with the receiving rail and/or the receiving eyelet for attachment of the carrier element to the base body. Alternatively, the carrier element may have a receiving rail and/or a receiving eyelet and the receiving section may have an engagement element. The gripping element may be controllable accordingly to selectively bring about or release a coupling.

According to a further exemplary embodiment, the receiving section may have a receiving opening, wherein the attachment element may have an attachment pin, which may be attachable in the receiving opening.

In particular, in an example configuration, the attachment pin may have a neck section and a head section, wherein the head section may have a larger diameter than the neck section. The receiving opening may have a first opening region and a second opening region, wherein the first opening region may be larger than the diameter of the neck section, and the head section and the second opening region may be larger than the diameter of the neck section and smaller than the diameter of the head section. For example, the first aperture region may form a circular aperture, while the second aperture region may be formed as an elongated hole. The first opening area and the second opening area may be connected. Thus, a carrier element may first be inserted through the first opening area with the attachment pin and may subsequently be moved in the direction towards the second opening area. Herein, only the neck section may slide along the second opening area. Due to the larger diameter of the head section, which may be larger than the diameter or opening distance of the second opening area, the carrier element, in this position, may not be detached from the base body.

In the following, further exemplary embodiments of the handling system described above for carrying component parts to be temperature-controlled are described.

According to a further exemplary embodiment, the handling system as described above may have a functional device. The functional device may consist, for example, of the device described above for carrying component parts to be temperature-controlled, or of a furnace hood.

According to a further exemplary embodiment, the base frame may be configured along a base plane, wherein the attachment device may be movable perpendicular to the base plane.

According to a further exemplary embodiment, the transport device may have at least one first guide structure, which may be fixed to the base frame and may extends (at least with a directional component) perpendicular to the base plane. The attachment device may have a first guide carriage, which may be movably coupled to the first guide structure. The first guide carriage may be selectively coupleable to the functional device.

The first guide structure may consist, for example, of one or more beams (steel beams), which may be fixed to the base frame. Furthermore, the first guide structure may also consist of a framework (or timber frame construction) of beams (or girders). The beams may form, for example, simultaneously guide rails for the first guide carriage. For example, the first guide carriage may be movable along a column as a beam. Alternatively, two spaced beams may be provided, at which the first guide carriage may be movably arranged.

In order to put, for example, a furnace hood over another furnace hood or over the component parts the guide carriages may be movable up to a height of 15 m to 20 m (meters). Accordingly, the guide structures may have a height of 15 m to 20 m or 25 m.

The guide carriage may be drivable mechanically, for example by a chain drive, or electrically, for example by a servo motor.

According to a further exemplary embodiment, the first guide carriage may have a controllable attachment element, in particular a clamping jaw. The controllable attachment element may be movable to a release position, in which the functional device may be decoupled from the controllable attachment element, and may be movable to a clamping position, in which the functional device may be coupled to the controllable attachment element.

The controllable attachment elements may be, for example, movable clamping jaws or an operable gripping element in order to implement a selective coupling to the functional unit. Furthermore, the controllable attachment element may have an extendable attachment bolt. The attachment element may be arranged translationally movable or pivotable between the release position and the clamping/fixing position. For this purpose, the functional unit may in particular have corresponding coupling areas, in which the controllable attachment element may engage. For example, a coupling area may have an attachment rail, an attachment sleeve, an attachment hook and/or an attachment eyelet, so that the controllable attachment element may engage selectively.

The second guide structure described below may be configured in correspondence to the first guide structure described above. Accordingly, the further first guide carriages, the second guide carriages and the further second guide carriages described below may be configured in correspondence to the guide carriage described above.

According to a further exemplary embodiment, the transport device may have at least one second guide structure which may be fixed to the base frame and extends perpendicular to the base plane. The attachment device may have a second guide carriage, which may be movably coupled to the second guide structure. The second guide carriage may be selectively coupleable to the functional device, wherein the first guide carriage and the second guide carriage may be arranged such that the guide carriages may be present opposite to each other with respect to the functional device. Thus, the functional device may, with advantage, be fixed, in particular clamped, between the first guide carriage and the second guide carriage.

In a further exemplary embodiment, a further third guide structure may also be fixed to the base body by a corresponding third guide carriage. In this way, plural attachment points to the functional device may be produced, and a robust coupling may be achieved.

According to a further exemplary embodiment, the transport device may have a further attachment device, wherein the further attachment device may be movable perpendicular to the base plane. Thus, the attachment device and the further attachment device may be arranged one after the other along a direction perpendicular to the base plane. In particular, the attachment device and the further attachment device may be moved relative to each other.

According to a further exemplary embodiment, the further attachment device may have a further first guide carriage, which may be movably coupled to the first guide structure, wherein the further first guide carriage may be selectively coupleable to the functional device or to a further functional device.

According to a further exemplary embodiment, the further attachment device may have a further second guide carriage, which may be movably coupled to the second guide structure. The further second guide carriage may be selectively coupleable to the functional device or to the further functional device. The further first guide carriage and the further second guide carriage may be arranged such that the further guide carriages may be present opposite to each other with respect to the functional device.

According to a further exemplary embodiment, the handling system may have a further functional device, which may be configured as a furnace hood. The further functional device may be selectively coupleable to the further attachment device, wherein the functional device may be, by the attachment device, and the further functional device may be, by the further attachment device, movable relative to each other.

Thus, for example, a further furnace hood may be put (or slipped) onto the device for carrying component parts to be temperature-controlled or onto a first furnace hood as a functional device. Alternatively, a further hood may be removed from the functional device by the further attachment device. Thus, a complete charging unit may be assembled outside of the temperature-control device by the handling system described. Firstly, the charge may be lifted onto the base. Subsequently, the protective hood may be put on. It may also be possible to place therewith the heating hood at the same time. When de-charging, the furnace hoods may be removed firstly before the charge may be lifted off.

Since the first and second guide structure and their movable attachment device may form a rigid unit, the functional units may be placed extremely accurately relative to each other. In a conventional use of a crane for the transport of functional units, the functional units may swing or sway on the crane rope so that a precise alignment of the functional units to each other may be extremely difficult and time-consuming. A centering (or an alignment) of the furnace hoods and/or a relative alignment of the functional units relative to each other may be made easier by the rigid unit of the handling system described above.

According to a further exemplary embodiment, the handling system may further have at least one coupling element, which may be configured to couple the functional device with the further functional device selectively to one charging unit, such that the charging unit may be movable perpendicular to the base plane by the first attachment device or the second attachment device.

According to a further exemplary embodiment, the functional device may form a gripper unit, to which a component part may be selectively coupleable, wherein the gripper unit may be selectively attachable to the base frame by the attachment device.

It is pointed out that the embodiments described here represent only a limited selection of possible embodiment variants of the invention. Thus, it is possible to combine the features of individual embodiments in a suitable manner, so that for the skilled person, with the explicit embodiments herein, a plurality of different embodiments is to be considered as obviously disclosed. In particular, some embodiments of the invention are described by device claims and other embodiments of the invention by process claims. However, it will immediately become clear to the person skilled in the art when reading this application that, unless explicitly stated otherwise, in addition to a combination of features belonging to one type of subject matter of the invention, also an arbitrary combination of features belonging to different types of subject matter of the invention is possible.

BRIEF DESCRIPTION OF THE DRAWINGS

For further explanation and better understanding of the present invention, examples of embodiments are described below with reference to the attached drawings. In the figures.

DETAILED DESCRIPTION OF EXEMPLARY EMBODIMENTS

Figure 1:
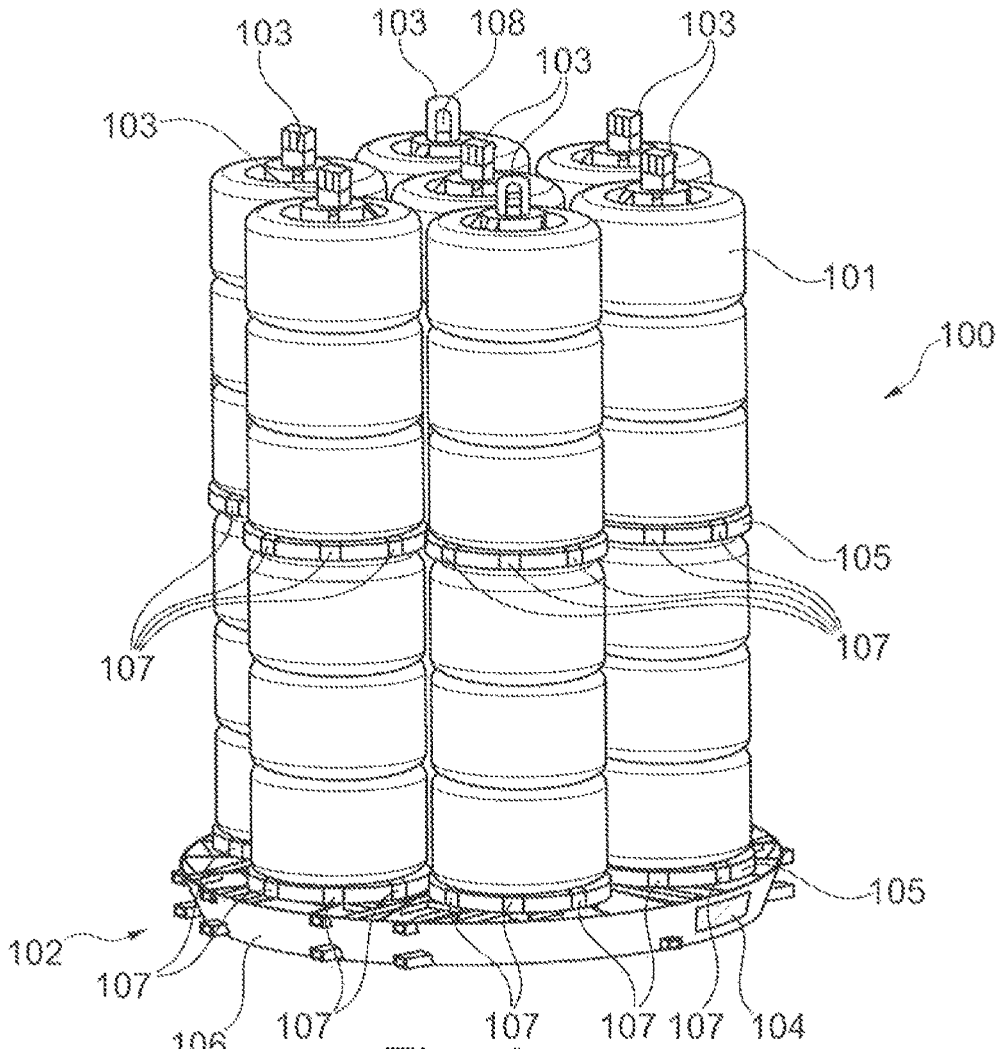
FIG. 1 is a schematic illustration of a device for carrying component parts to be temperature-controlled according to an exemplary embodiment of the present invention.

Same or similar component parts in different figures are provided with the same reference numerals. The illustrations in the figures are schematic.

FIG. 1 shows a device 100 for carrying component parts 101 to be temperature-controlled, in particular rolled metal strips or metal wires, in a temperature-control device 701. The carrier device may have a base body 102 and a carrier element 103, to which a component part 101 may be attachable, wherein the carrier element 103 may be detachably attachable to the base body 102 or lies loosely on it. The base body 102 may have a transport coupling 104, which may be configured such that the transport coupling 104 may be detachably fixable to a handling system 600 for handling the device 100.

The device 100 may have a plurality of carrier elements 103. A carrier element 103 may serve to fasten the component part 101 to the base body 102 of the device. The carrier element 103 may be formed like a column as a so-called headstock. The carrier element 103 may be detachably attached to the base body 102. For example, the carrier element 103 may be attached to the base body 102 by a detachable snap-in connection or a clamp connection. A plurality of component parts 101 may be attached to the carrier element 103. The carrier element 103 may be equipped with the component parts 101, for example, at a distance from the base body 102, and then attached to the base body 102. Alternatively, the carrier element 103 may be attached to the base body 102 and may then be equipped with the component parts 101.

The base body 102 may serve to support the carrier elements 103 on the one hand and to transport them on the other hand. The base body 102 may have a transport coupling 104, to which a handling system 600 (see FIG. 6) may be detachably fixable. Thus, the device 100 may be transported between a set-up location, where the base body 102 may be equipped with the carrier elements 103 and/or the component parts 101, and the temperature-control device 701 (see FIG. 7). The transport coupling 104, for example, may consist of a bolt so that an attachment device of the handling system 600 may be coupleable thereto.

The base body 102 together with the carrier elements 103 and the component parts 101 may define a charging unit, which may be introduced into the temperature-control device 701. With the device 100 according to the invention and described above, the entire device 100 may thus be equipped with the component parts 101 to be temperature-controlled at a set-up location remote from the temperature-control device 701 without having to interrupt a temperature-control process in the temperature-control device 701.

The carrier element 103 may form a carrier column (so-called headstock), wherein the carrier column 103 may be configured such that the component part 101 may be pluggable over the column as a coiled metal strip or metal wire. Plural component parts 101 may be attached and/or plugged onto a support column one above the other. A support element 105 or a support platform may be provided between the component parts 101 or between a group of component parts 101, which may be plugged onto to a support column, in order to reduce the weight load of the component parts 101 there underneath. The support element 105 may be connected to the carrier column 103 in order to transfer the weight force of the component parts 1 resting on the support element 105 via the carrier column into the base body 102.

Figure 17:
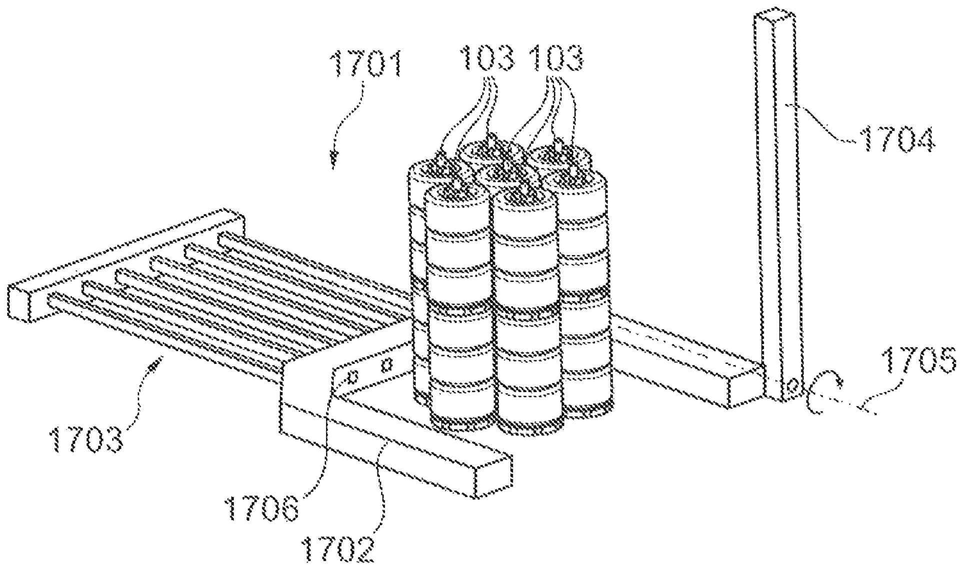
FIG. 17 to FIG. 22 are schematic illustrations of a gripper unit and a process sequence of the gripper unit, according to an exemplary embodiment of the present invention.
Figure 18:
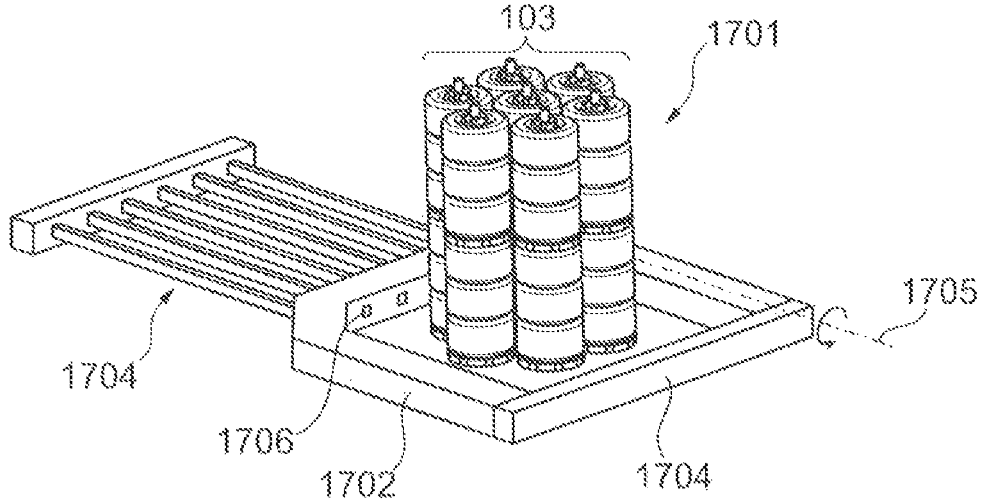

The support elements 105 also may have engagement openings 107, in which gripping elements, such as the rods 1703 from FIG. 17 and FIG. 18, may engage in order to raise and lower the support element 105. Component parts 101, such as wire coils and/or sheet metal rolls, for example, may be stacked on the support elements 105. By raising and lowering the support elements 105, the component parts 101 stacked on them may be removed from a carrier element 103, or a carrier element 103 may be equipped with the component parts 101.

Figure 2:
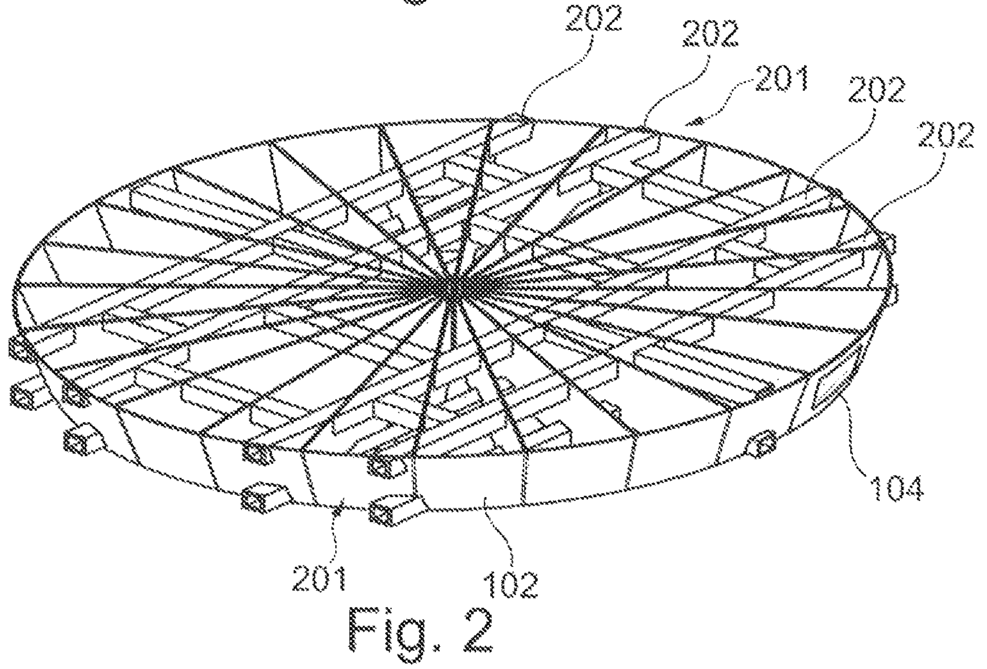
FIG. 2 is a schematic illustration of a base body of the device from FIG. 1.

FIG. 2 shows a base body 102 from FIG. 1. The base body 102 may have a base section which may be placeable on a ground (or floor). The base body 102 may be configured such that a weight force of the component part 101 may be introducible via the base body into the ground. The base body 102 thus may form a ground platform. The base body 102 may be formed as a frame-like structure consisting of rigidly connected steel beams. For example, the device 100 and its component parts may be configured such that the device 100 as a whole may be placed on a base of the temperature-control device 701 and may pass through the entire heat treatment of the component parts 101 in the temperature-control device 701.

The base body 102 may have a receiving section 201 having receiving rails 202. The carrier element 103 may have a gripper element, which may be selectively attachable to the base body 102 having the receiving rail 202 for fixing the carrier element 103 to the base body 102.

Figure 3:
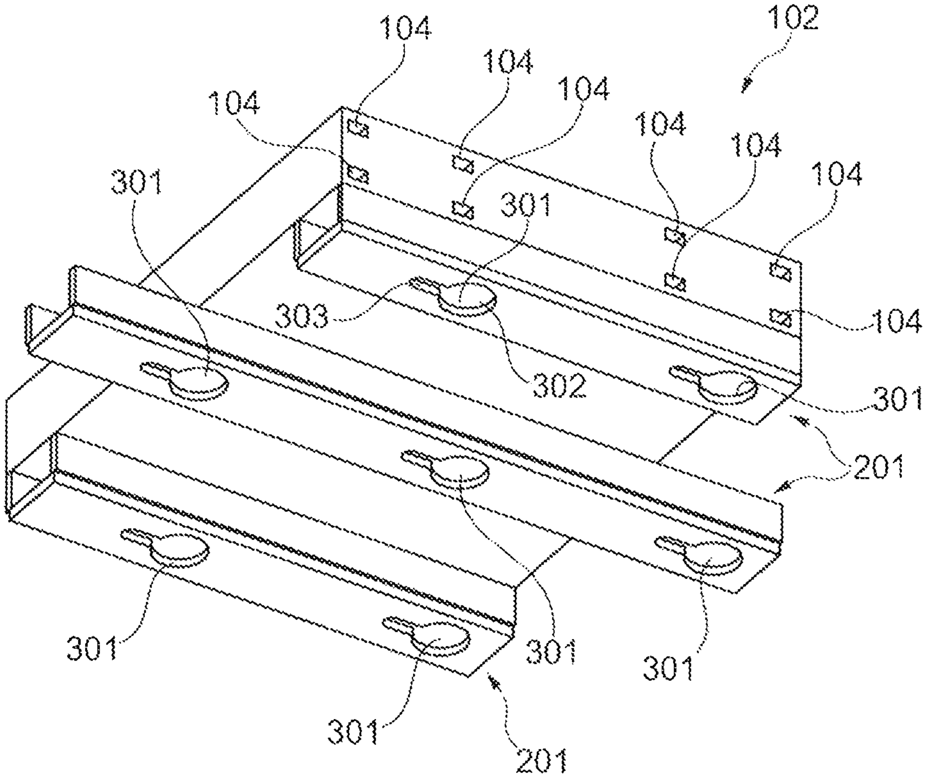
FIG. 3 is a schematic illustration of a base body, in which carrier elements can be suspended, according to an exemplary embodiment of the present invention.
Figure 4:
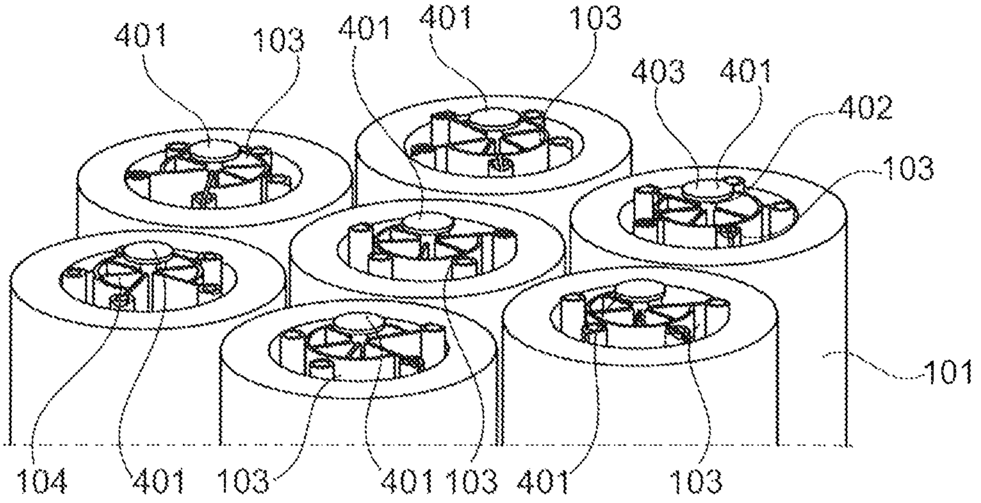
FIG. 4 is a schematic illustration of carrier elements, which are configured to be suspended in the base body shown in FIG. 3.
Figure 5:
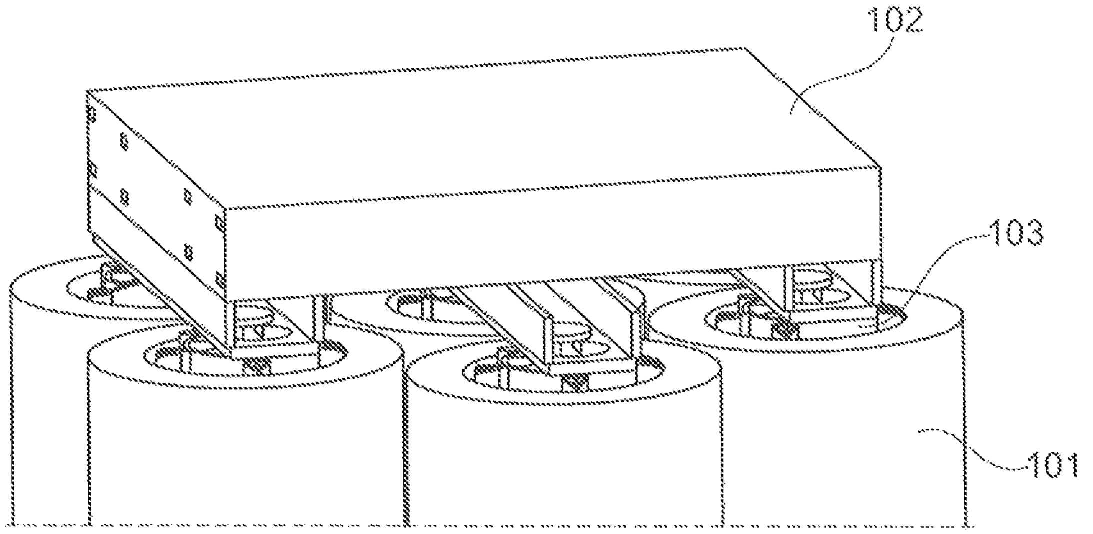
FIG. 5 is a schematic illustration of the base body from FIG. 3 and the carrier elements from FIG. 4 according to an exemplary embodiment.

FIG. 3 shows a schematic illustration of a base body 102, in which a carrier element 103 may be suspendable. FIG. 4 shows a schematic illustration of carrier elements 103, which may be configured to be suspended in the base body 102 shown in FIG. 3. FIG. 5 shows a schematic illustration of the base body 102 from FIG. 3 and the carrier elements 103 from FIG. 4.

The carrier element 103 may be suspendable to the base body 102 for detachable fixing, so that the carrier element 103 may extend from the base body 102 in the direction towards the ground. For example, the carrier element 103 may stand on the ground or on the base of the temperature control device 701 so that the weight force may be lead via the carrier element 103 into the ground. The base body 102, to which the carrier elements 103 may be suspended and/or attached, may be arranged at a distance from the ground. The base body 102 may thus connect the carrier elements 103 so that a handling system 600 may grip the base body 102 at its transport coupling 104 and may transport the entire device to a desired location.

The receiving section 201 may have a receiving opening 301, wherein the attachment element 401 of a carrier element 103 may have an attachment pin, which may be attachable in the receiving opening 301.

In particular, the attachment pin 401 may have a neck section 402 and a head section 403, wherein the head section 403 may have a larger diameter than the neck section 402. The receiving opening 301 may have a first opening area 302 and a second opening area 303, wherein the first opening area 302 may be larger than the diameter of the neck section 402 and the head section 403, and the second opening area 303 may be larger than the diameter of the neck section 402 and smaller than the diameter of the head section 403. The first opening area 302 may form, for example, a circular opening, while the second opening area 303 may be formed as an elongated hole. The first opening area 302 and the second opening area 303 may be connected. Thus, a carrier element 103 may first be inserted with the attachment pin through the first opening area 302 and may then be moved in the direction towards the second opening area 303. Only the neck section 402 may slide along the second opening area 303. Due to the larger diameter of the head section 403, which may be larger than the diameter or opening distance of the second opening area 303, the carrier element 103 may not be detached from the base body 102 in this position.

Figure 6:
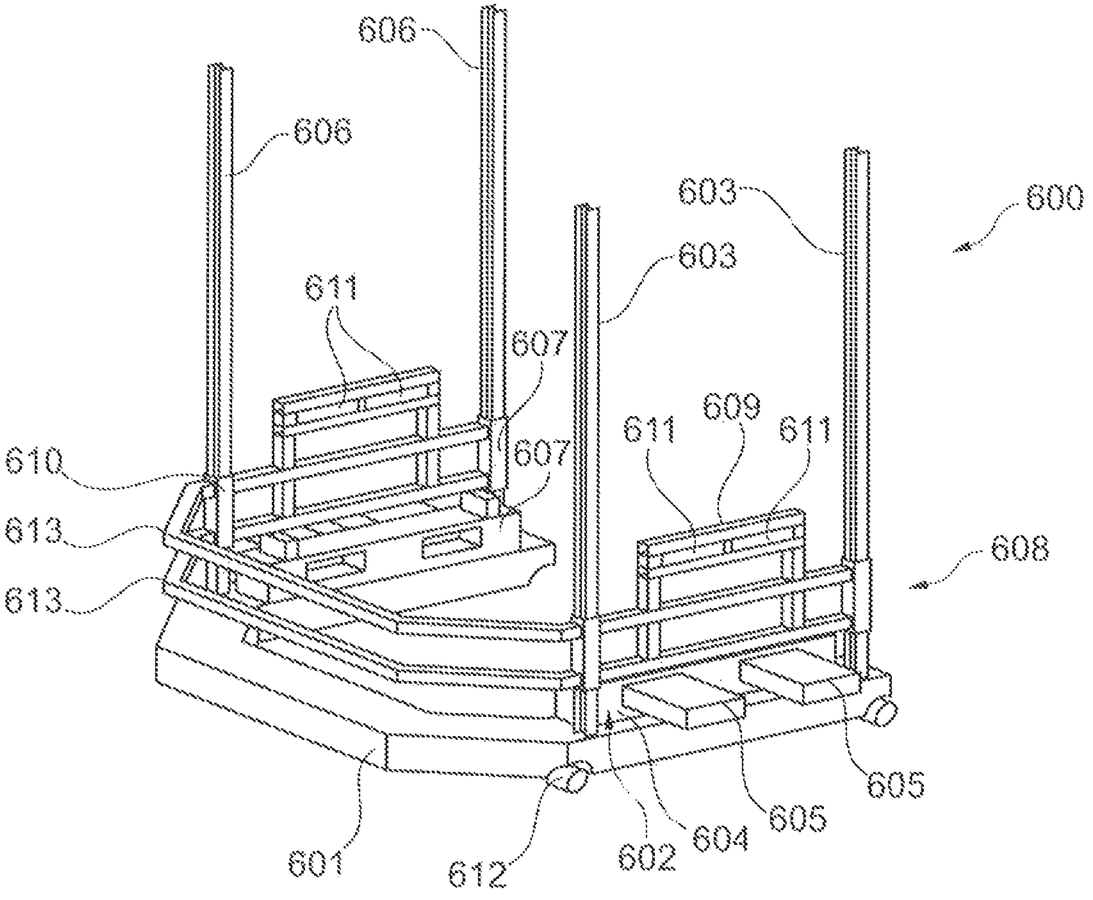
FIG. 6 is a schematic illustration of a handling system for handling a functional device of a temperature-control device.

FIG. 6 shows a handling system 600 for handling a functional device of a temperature control device 701. The handling system 600 may have a transport device. The transport device may have a base frame 601, which may be transportable along a ground, and an attachment device 602, which may be coupled to the base frame 601. The attachment device 602 may be configured to selectively attach the functional device to the base frame 601. The base frame 601 may be configured such that the base frame 601 may be transportable for transporting the functional device between a set-up location, at which the functional device may be selectively attachable to the base frame 601, and a temperature-control location in the temperature-control device 701.

A functional device may describe, for example, a device 100 described above for carrying component parts to be temperature-controlled 101. Furthermore, a functional device may also be understood to be a guide cylinder 801 or a furnace hood 902, 903, which may be put, for example, on a base of the temperature-control device 701. In a hood furnace, for example, a large number of different furnace hoods 902, 903 may be placed one above the other. For example, a furnace hood 903 having a larger diameter may be placed over a furnace hood 902 having a smaller diameter (see FIG. 10), so that the smaller furnace hood 902 may be located within the larger furnace hood 903. The innermost furnace hood 902 may act as a protective hood, for example, so that a protective gas atmosphere may be formed in an inner annealing chamber. Another furnace hood 903, such as for example a heating hood or a cooling hood, may be slided over the protective hood 902.

The base frame 601 may be formed along a base plane, wherein the attachment device 602 may be movable perpendicular to the base plane. The transport device may have at least one first guide structure 603, which may be fixed to the base frame 601 and may extend (at least with a directional component) perpendicular to the base plane. The attachment device 602 may have a first guide carriage 604, which may be movably coupled to the first guide structure 603. The first guide carriage 604 may be selectively coupleable to the functional device.

The first guide structure 603 may consist, for example, of one or more beams (steel beams), which may be fixed to the base frame 601. For example, the beams simultaneously may form guide rails for the first guide carriage 604. For example, the first guide slide 604 may be movable along a column as a beam. In particular, two spaced beams of the first guide structure 603 may be provided, at which the first guide carriage 604 may be movably arranged.

The first guide carriage 604 may have a controllable attachment element 605, in particular a clamping jaw. The controllable attachment element 605 may be movable to a release position, in which the functional device may be decoupled from the controllable attachment element 605, and may be movable to a clamping position, in which the functional device may be coupled to the controllable attachment element 605. In FIG. 6, the attachment elements 605, 611 may be in the release position. The controllable attachment element 605 may be, for example, a movable clamping jaw or an operable gripping element for implementing a selective coupling with the functional unit.

The second guide structure 606 described in the following may be configured according to the first guide structure 603 described above. Accordingly, the further first guide carriages 609, the second guide carriages 607 and the further second guide carriages 610 described below may be formed in correspondence to the first guide carriage 603 described above.

The second guide structure 606 may also be fixed to the base frame 601 and may extend perpendicular to the base plane. The attachment device 602 may have a second guide slide 607, which may be movably coupled to the second guide structure 606. The second guide carriage 607 may be selectively coupleable to the functional device, wherein the first guide carriage 604 and the second guide carriage 607 may be arranged such that the guide carriages 604, 607 may be opposite to each other with respect to the functional device. Furthermore, a further attachment device 608 may be provided, which may be movable perpendicular to the base plane. Thus, the attachment device 602 and the further attachment device 608 may be arranged one after the other, or one above the other, along a direction perpendicular to the base plane. In particular, the attachment device 602 and the further attachment device 608 may be moved relative to each other.

The further attachment device 608 may have a further first guide carriage 609 which may be movably coupled to the first guide structure 603, wherein the further first guide carriage 609 may be selectively coupleable to the functional device or to a further functional device. The further attachment device 608 may have a further second guide carriage 610, which may be movably coupled to the second guide structure 607. The further second guide slide 607 may be selectively coupleable to the functional device or to the further functional device. The further first guide carriage 609 and the further second guide carriage 610 may be arranged such that the further guide carriages 609, 610 may be opposite to each other with respect to the functional device.

The further first guide carriage 609 and the further second guide carriage 610 may be coupled together, for example by reinforcing bars (or struts) 613. Thus the further attachment device 608 and the first guide structure 603 and the second guide structure 606 may be stiffened and/or reinforced.

Furthermore, roller elements 612 may be arranged on the base frame 601. The roller elements 612 may serve to move the base frame 601 along the ground.

Figure 7:
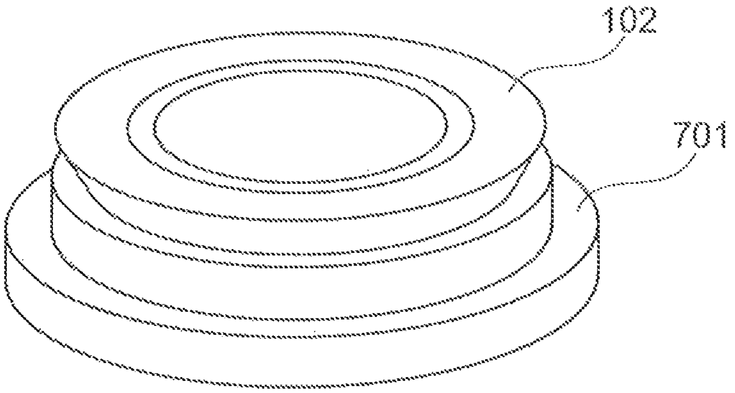
FIG. 7 shows a schematic illustration of a furnace base, on which rests a base body according to an exemplary embodiment.

FIG. 7 shows, in an exemplary manner, a furnace base 701 of a temperature-control device, on which a base body 102 from FIG. 1 or FIG. 2 may be placed. The component parts 101 may be attached to the base body 102. The base body 102 of the attachment device 602 of the handling system 600 may be liftable from the furnace base 701 and transportable. For example, a total mass consisting of, for example, the component parts 101 and the furnace hoods of a hood-type furnace of 50,000 kg may be placed on the furnace base 701 (annealing base).

Figure 8:
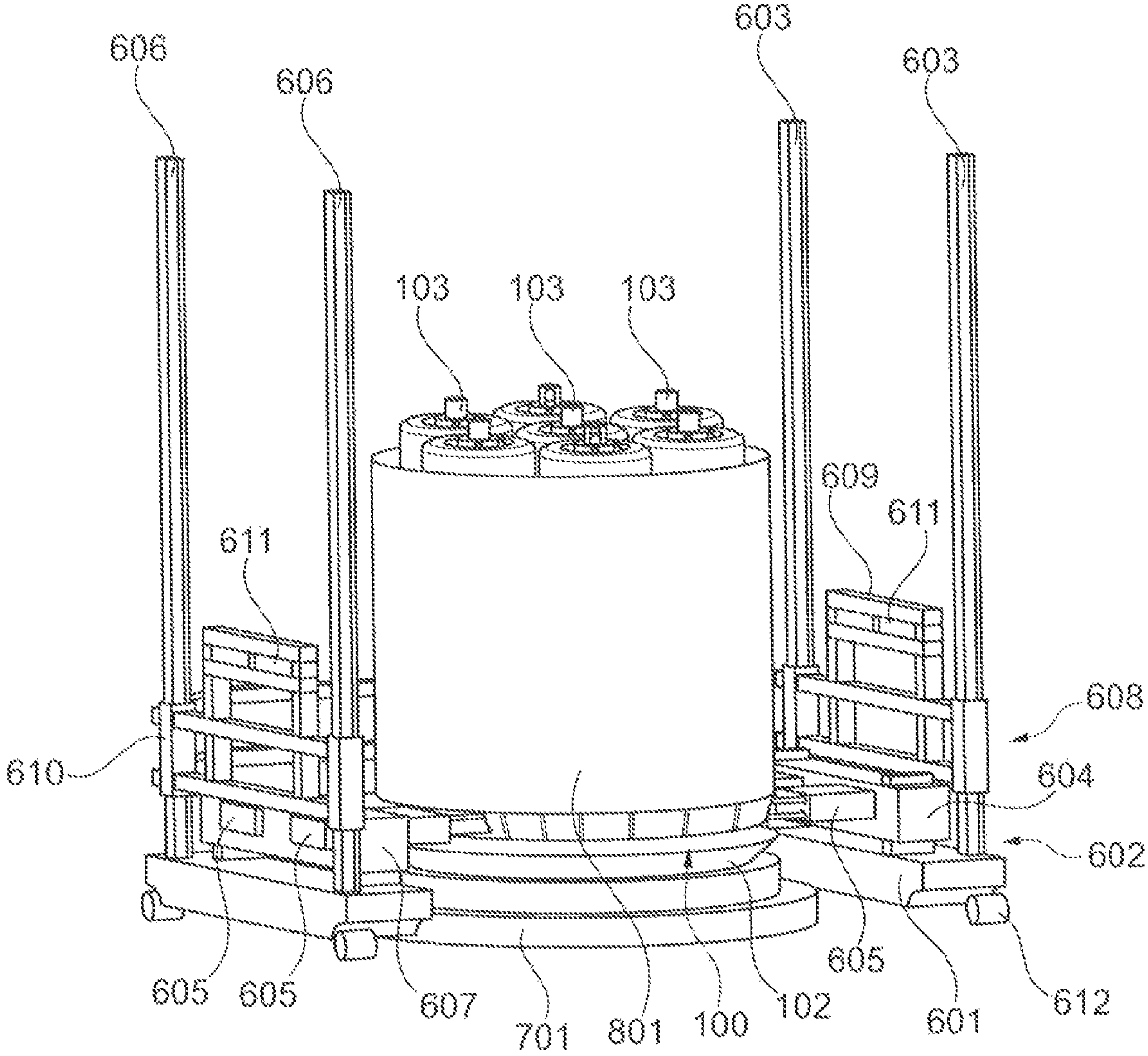
FIG. 8 shows a schematic illustration of a handling system which places functional units onto a furnace base.

FIG. 8 shows the handling system 600, which may place a device 100 (e.g. from FIG. 1) consisting of a base body 102, on which corresponding carrier elements 103 with component parts 101 may be attached, on the furnace base 701. The first guide carriage 604 and the second guide carriage 607 may each be moved to a lower position along the guide structures 603, 606. The controllable attachment elements 605 of the guide carriages 604, 607 may therein be set in the clamping position and may thus fix and/or couple the base body 102. A guide cylinder 801 may be placed over the carrier elements 103. The guide cylinder 801 may be coupled to the base body 102, or may rest on the base frame 102 and additionally may stabilize the carrier elements 103 with the component parts 101. Thus, by moving the guide slides 604, 607 along the guide structures 603, 606, the base body 102 may be raised or lowered together with the guide cylinder 801.

The further attachment device 608 consisting of the further first and second guide carriages 609, 610 may be in an inactive state, wherein the further attachment elements 611 may be in the release position.

Figure 9:
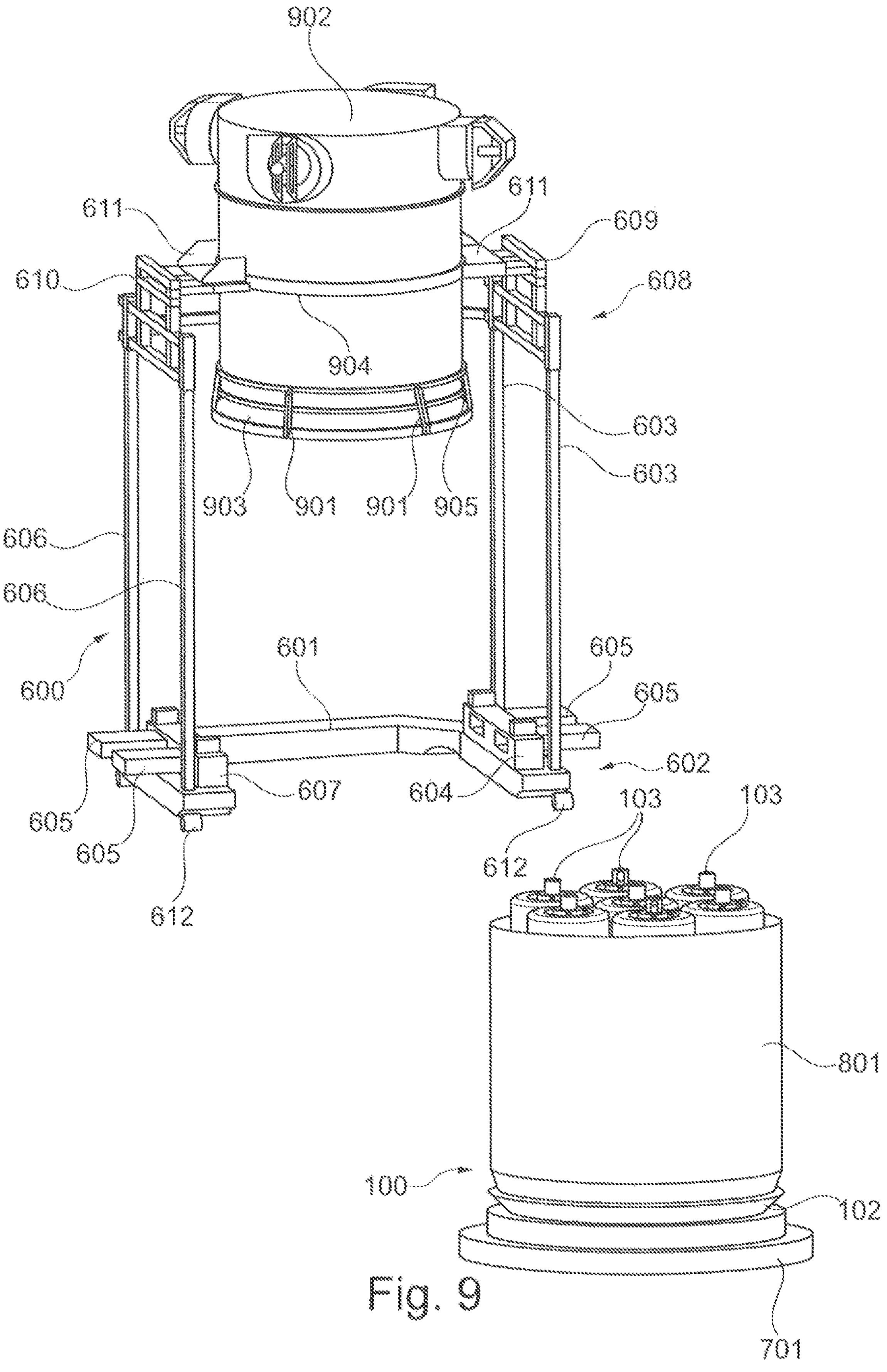
FIG. 9 to FIG. 11 are schematic illustrations of a handling system and a furnace base, wherein the handling system carries furnace hoods in order to put them over a furnace hood that is resting on the furnace base, according to an exemplary embodiment of the invention.
Figure 10:
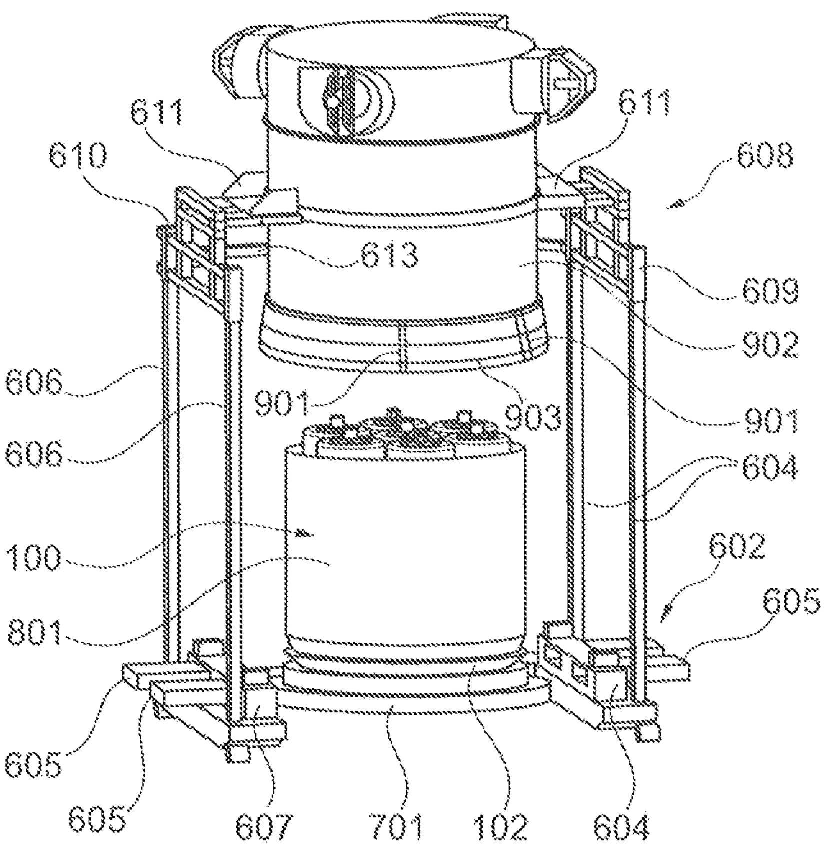
Figure 11:
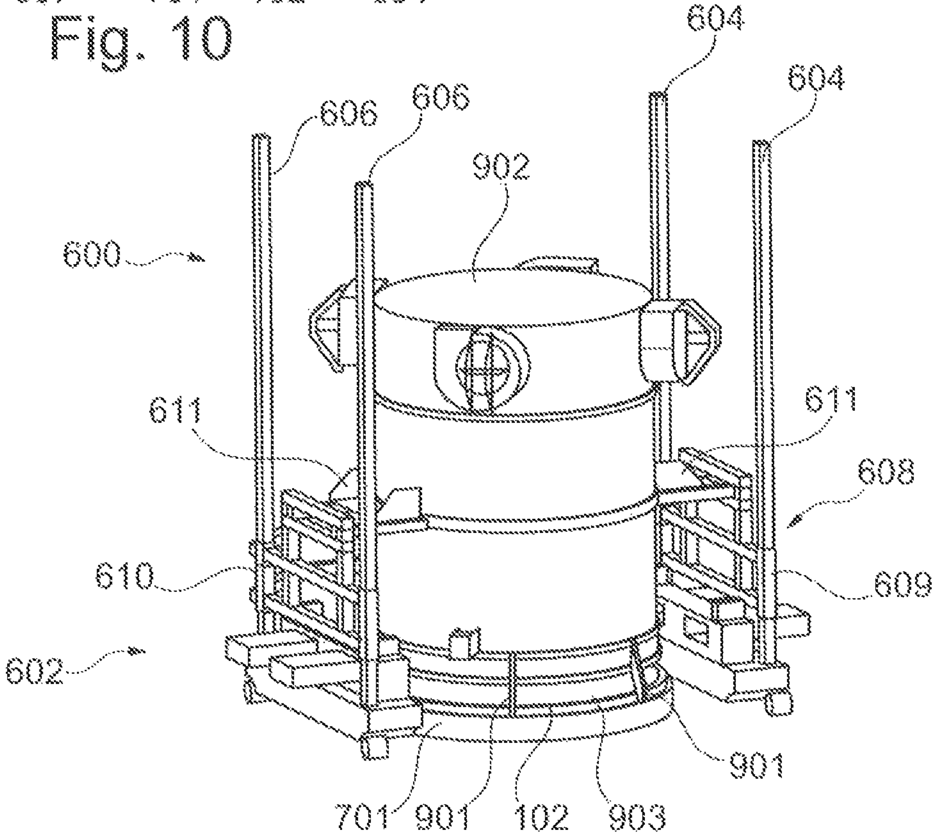

FIG. 9 to FIG. 11 show, in an exemplary manner, a process for forming a charging unit 1201 (see FIG. 12) by the handling system 600.

FIG. 9 first shows the device 100, the base body 102 of which may rest on the furnace base 701. The guide cylinder 801 may be slipped over the carrier elements 103. The device 100 may, for example, also be placed on the furnace base 701 by the handling system 600 (see FIG. 6).

The further attachment device 608 of the handling system 600 may carry a further furnace hood 902, in which a smaller furnace hood 903 may be nested. The furnace hoods 902, 903 may be firmly connected by a coupling element 901. The coupling element 901 may, for example, fix the furnace hood 903 in the larger furnace hood 902 by a bolt-and-lug connection. The further first guide carriage 609 and the further second guide carriage 110 may be moved along the guide structures 603, 606 to a topmost position. The further attachment elements 611 may have been set, e.g. swivelled over, to the clamping position. The attachment elements 611 of the further guide carriages 609, 610 may be coupled to the further outer furnace hood 902. The furnace hood 902 may have, for example, a coupling area, which may consist, for example, of a circumferential guide rail or a ring groove, in which the further attachment elements 611 may engage.

The guide carriages 604, 607 of the attachment device 602 may have been moved to the lowest position along the guide structures 603, 606, wherein their controllable attachment elements 605 may be in the release position.

FIG. 10 shows that, in this configuration, the handling system 600 may be moved over the furnace base 701 and/or over the device 100 by the roller elements 612. Due to the rigid structure of the handling system 600, an exact positioning and centering of the furnace hoods 902, 903 over the furnace base 701 or the device 100 may quickly be possible. In particular, the rigidity of the handling system 600 may be increased by coupling and stiffening the mounting carriages 609, 610 with the connecting reinforcement bar 613.

After an exact alignment of the handling system 600, the further guide carriages 609, 610 may be moved downwards along the guide structures 603, 606 as shown in FIG. 11, until the furnace hoods 902, 903 may be slipped over the device 100 and, for example, may rest on the furnace base 701.

Then, the other attachment elements 611 may be set to the release position, and the handling system 600 may be removed from the furnace base 701. The hood-type furnace as a temperature-control device may thus be finally converted, so that a temperature-control process of the component parts 101 may be carried out.

After the temperature-control process of the component parts 101, the handling system 600 may be used again, and may remove the furnace hoods 902, 903 from the furnace base 701 by the attachment device, and may lift off the component parts 101 together with the device 100 by the attachment device 602 so that component parts 101 may be quickly determined again on the furnace base 701.

Figure 12:
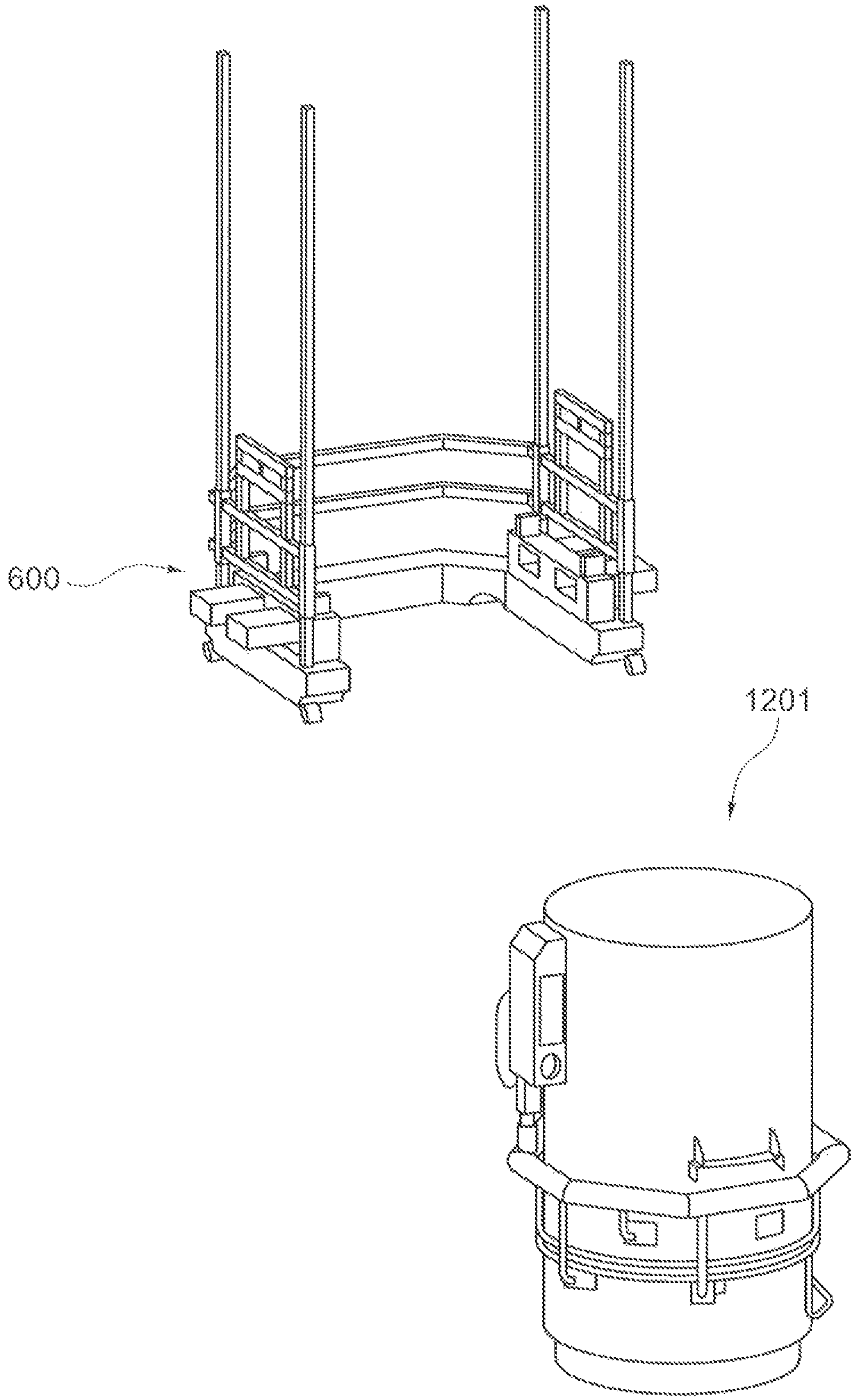
FIG. 12 shows a schematic illustration of a handling system which has assembled a charging unit, according to an exemplary embodiment of the present invention.

FIG. 12 shows a schematic illustration of a handling system 600 after the assembling of a charging unit 1201. A unit of component parts 101, which may be temperature-controlled in the temperature-control device in one temperature-control process, is called a charge (or batch). The charging unit 1201 may define a unit of the charge and the various superimposed hoods that may surround the charge to be temperature-controlled.

Figure 13:
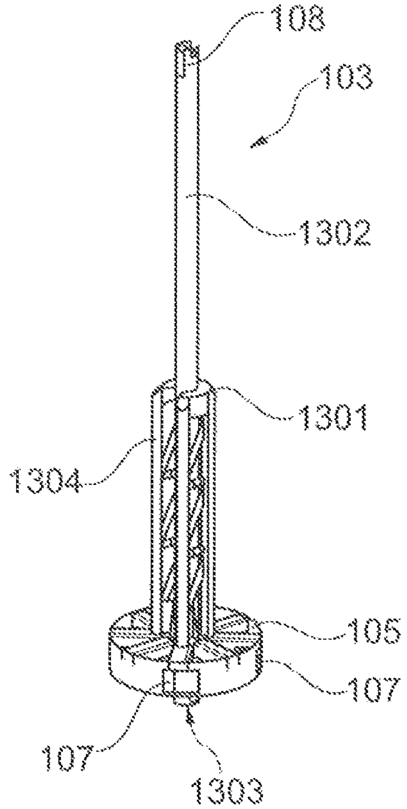
FIG. 13 and FIG. 14 are schematic illustrations of a carrier element and/or a carrier column according to an exemplary embodiment of the present invention.
Figure 14:
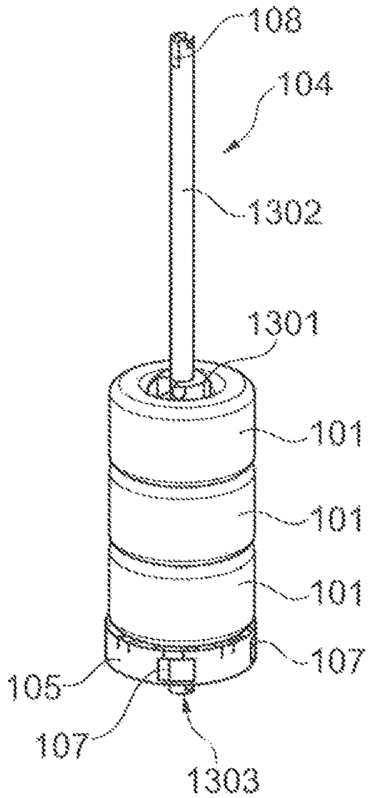

FIG. 13 and FIG. 14 show detailed views of a carrier element 103 from FIG. 1. The carrier element 103 shown may consist of a carrier tube 1301 and a carrier beam 1302. The support element 105 may have a central opening so that it may be plugged onto the carrier tube 1301. By attachment means, each support element 105 may be fixed at a desired position along the carrier tube 1301. Alternatively, the support element 105 may be made integral and non-detachable with the carrier tube 1301. The support element 105 may form e.g. a bottom area, from which the carrier tube 1301 may extend.

The component parts 101 may consist for example of rolled up metal strips or metal wires. These may also be slipped over the carrier tube 1301 and accordingly may rest on a support element 105. The carrier tube 1301 may further have guide rails 1304, which may engage in corresponding guide grooves of the support elements 105 and may guide the component parts 101.

The support element 105 may further have engagement openings 107, in which gripping elements (e.g. the rods of the rod unit 1703 from FIG. 17) may engage in order to raise and lower the support element 105. By lifting and lowering the support element 105 or the carrier beam 1302, the component parts 101 placed thereover may be removed from the carrier beam 1302, or a carrier beam 1302 may be equipped with the component parts 101.

The carrier beam 1302 may be inserted into the carrier tube 1301. After the insertion of the carrier beam 1302, the latter may be secured against being pulled out again, for example, by a locking element 1303, such as for example a bolt. At the upper end of the carrier beam 1302, the beam section 108 may be formed, for example as an eyelet or bolt, so that a transport device 1605, such as a crane hook, may grip the carrier beam 1302, and thus transport the entire carrier element 103. A carrier element 103 equipped accordingly with component parts 101 may, for example, be arranged on a base body 102 according to FIG. 1 and/or a furnace base 701 from FIG. 7.

Figure 15:
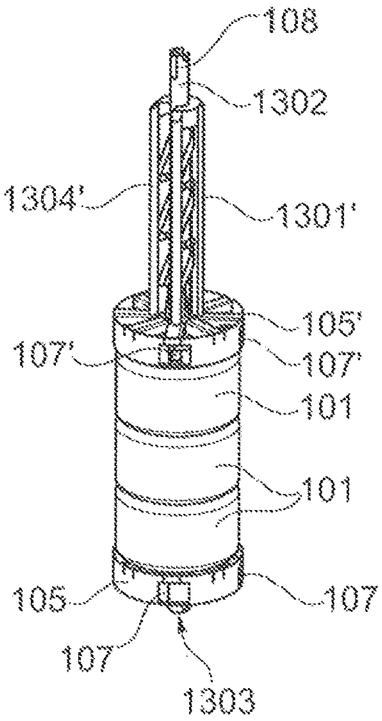
FIG. 15 and FIG. 16 are schematic illustrations of a carrier element having two carrier elements provided one above the other.
Figure 16:
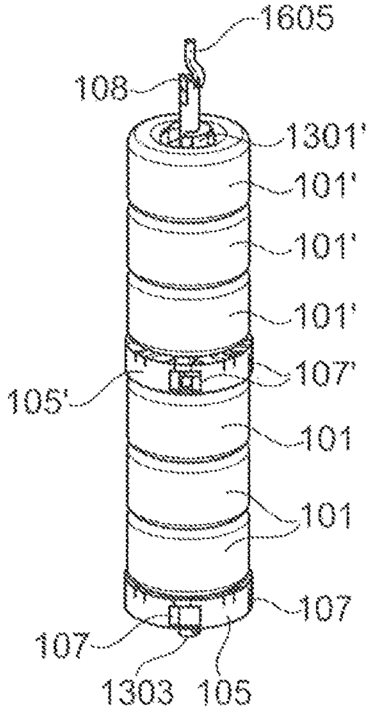

FIG. 15 and FIG. 16 show a further exemplary embodiment, on which two support elements 105, 105' together with their carrier tubes 1301, 1301' may be stacked on top of each other along the carrier beam 1302. The second support element 105' and the second carrier tube 1301' may be configured according to the carrier element 1301 from FIG. 13 and FIG. 14. On each support element 105, 105', for example, three component part units 101, 101', such as wire coils, may be arranged. Herein, the support elements 105, 105' may be connected with the respective carrier tubes 1301, 1301' in a force transmitting manner. Thus, the weight force of the component parts 101' may be transmitted via the support element 105' to the corresponding carrier tubes 1301, 1301' and the carrier beams 1302. The weight force of the upper component parts 101' may thus not be transferred to the lower component parts 101 of the lower support element 105, so that the load on the lower component parts 101 may remain low. In other words, the support elements 105, 105' may be fixed to the carrier tube 1301, 1301' at a distance from each other along the carrier tube 1301, 1301' so that the component parts 101 and the component parts 101' may be spaced apart from each other.

The lowest support element 105 may further form, for example, a stand, so that the carrier unit 103 may stand independently.

FIG. 17 to FIG. 22 show a gripper unit 1701 and an operation of this gripper unit 1707 according to an exemplary embodiment of the present invention. The gripper unit 1701 may serve to grip the component parts 101, e.g. the wire coils from FIG. 1 or FIG. 13, in order to attach them to or detach them from a base body 102 according to FIG. 1 and/or a furnace base 701 from FIG. 7, for example. The gripper unit 1701 shown as an example may have a gripper frame 1702. The gripper frame 1702 may have a U-shape consisting of two parallel beams which may be connected to a common base beam.

Figure 19:
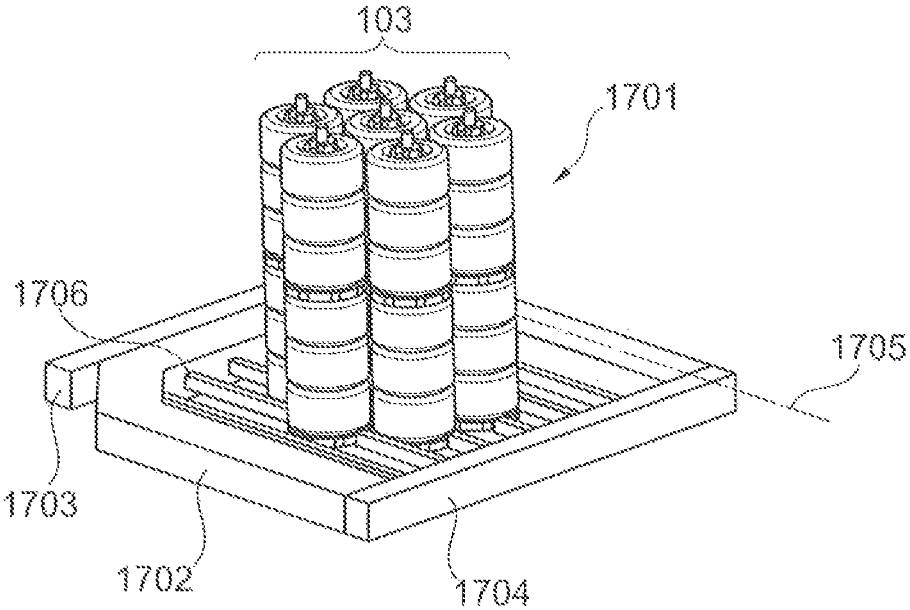

In the interior of the gripper frame 1702 several rods of a rod unit 1703 may run from one side of the gripper frame 1702 in the direction towards the open side of the U-shaped gripper frame 1702 (see FIG. 19, 20). The rods 1703 may be configured such that they may be retracted into the corresponding engagement openings 107. In this respect, the engagement openings 107 may form passage openings through the support elements 105. The gripper frame 1702 may initially be adjusted to a predetermined height. Subsequently, the gripper frame 1702 may move horizontally in the direction of the support element 105, whereby the rods 1703 may retract into the engagement openings 107. The two parallel bars of the U-shaped base frame 1702 may be formed such that one or more carrier columns and/or carrier elements 103 may be enclosed. Accordingly, the rods of the rod unit 1703 may engage in corresponding engagement openings 107 of plural support elements 105 of adjacent carrier columns.

The rods of the rod unit 1703 may be dimensioned such that they may protrude on the opposite side after the retracting into the support element 105. The free ends may, for example, be reinforced by reinforcing elements, e.g. a, reinforcing beam 1704, in order to enable a higher maximum transport weight of the rod unit 1703.

On the open side of the U-shaped base frame 1702, for example, a corresponding reinforcing beam 1704 may be arranged on the gripper frame 1702 as a reinforcing element. The reinforcing beam 1704 may be arranged on the gripper frame 1702 rotatably or swivelably around a rotation axis 1705 as shown. Additionally or alternatively, the reinforcing beam 1704 may also be moved laterally along the axis of rotation 1705. The rods 1703 may thus rest on the reinforcement beam 1704, for example, or may be stored in corresponding openings of the reinforcement beam 1704.

As shown in FIG. 17 to FIG. 22, the rod unit 1703 may further be moved (horizontally) relative to the base frame 1702 so that the rods of the rod unit 1703 may be retractable from the outside into the interior of the U-shaped base frame 1702 through through-holes 1706 in the base beam of the gripper frame 1702. According to this embodiment, a method of operation is illustrated in FIG. 17 to FIG. 22.

As can be taken from FIG. 17, the rod unit 1703 may first be drawn out of the gripper frame 1702 and the reinforcing beam 1704 may be turned around the rotation axis 1705 into an opening position, so that the open side of the U-shaped base frame 1702 may be open. The gripper unit 1701 may subsequently be moved horizontally such that the carrier elements 103 to be transported may be in the middle of the U-shaped base frame 1702.

Then, as shown in FIG. 18, the reinforcing beam 1704 may be rotated around the rotation axis 1705 so that the open side of the gripper frame 1702 may be closed.

Then, as shown in FIG. 19, the rod unit 1703 may be moved in the direction towards the carrier beam 1704 and, for example, along the rotation axis 1705. Thereby the engagement openings 107 of the support elements 105 may be aligned such that the rods of the rod unit 1703 may be pushed through the engagement openings 107. After the rods of the rod unit 1703 may have been completely pushed into the interior of the U-shaped base frame 1702, the ends of the respective rods of the rod unit 1703 may rest on the reinforcing beam 1704 or may be supported in corresponding receiving openings of the reinforcing beam 1704. Due to the bearing of the rods of the rod unit 1703 in the through-openings 1706 of the base frame 1702 and the reinforcing beam 1704, the rods of the rod unit 1703 may be reinforced and may therefore carry a high weight of component parts 103.

Figure 20:
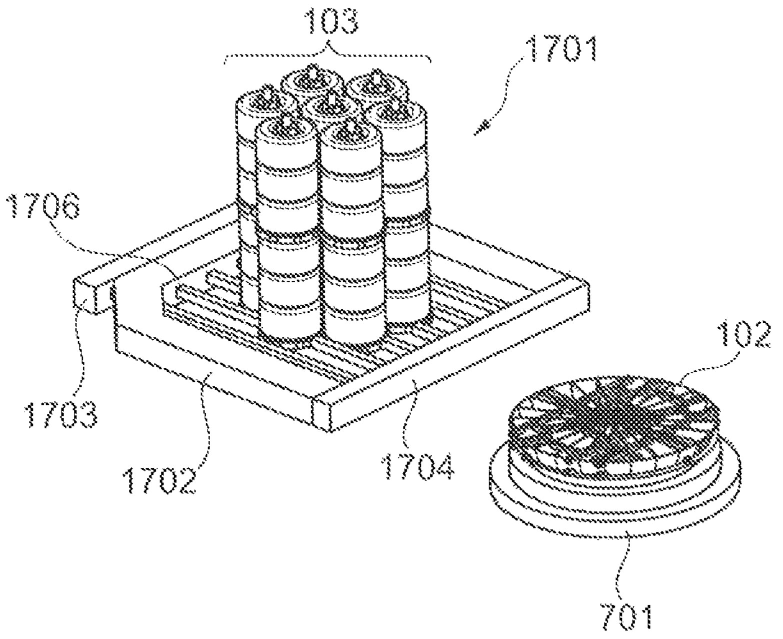

After the bars of bar unit 1703 have been retracted, the gripper frame 1702 may be raised or lowered in order to move the support elements 105 along the carrier elements 103 accordingly and/or to transport the support elements 105 together with the component part 101 to desired locations. As shown in FIG. 20, the gripper unit 1701 may place the carrier elements 103 on a base body 102 and/or on a furnace base 701.

Figure 21:
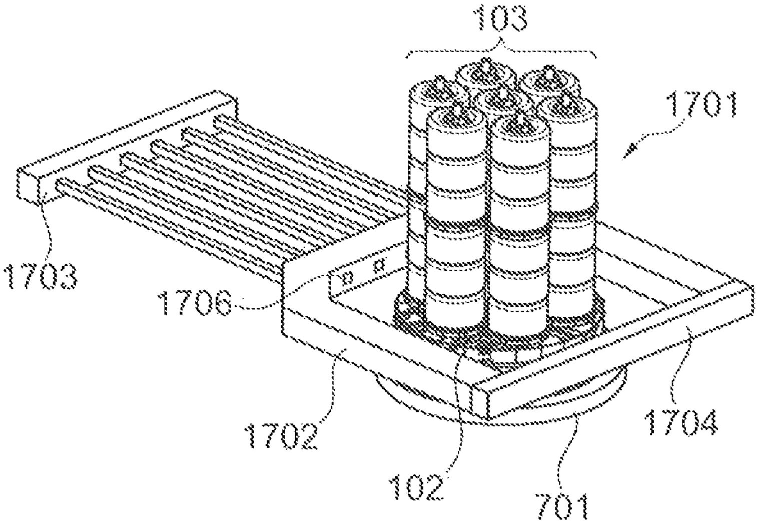
Figure 22:
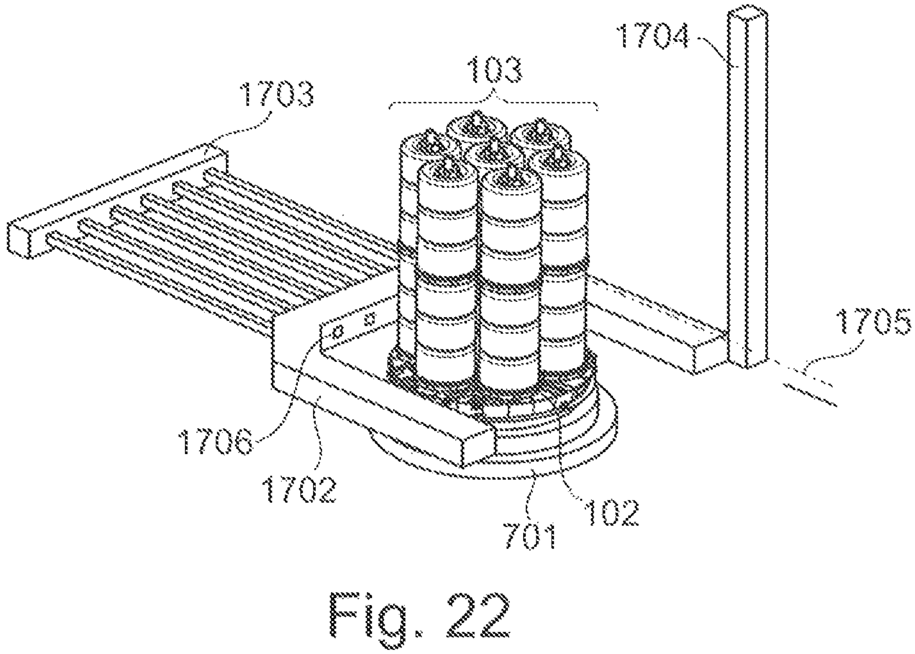

As shown in FIG. 21, for releasing the carrier units 103, the rods of the rod unit 1703 may first be moved out of the interior of the U-shaped base frame 1702. Then, as shown in FIG. 21, the reinforcing bar 1704 may be swivelled around the rotation axis 1705 into an opening position, so that the open side of the U-shaped base frame 1702 may be open and the inside may be accessible. Subsequently, the gripper unit 1701 may again be moved horizontally or vertically, and may handle and/or transport a new charge of component parts 103.

The gripper unit 1701, for example, may represent a functional device according to the present invention, and may be gripped by the controllable attachment elements 605, for example of the first guide carriage 604 of the handling system 600 from FIG. 6, and may be transported accordingly.

Supplementarily, it should be pointed out that "having" does not exclude other elements or steps, and that "a" or "an" does not exclude a plurality. It should also be pointed out that features or steps that are described with reference to one of the above embodiment examples can also be used in combination with other features or steps of other embodiment examples described above. Reference numerals in the claims are not to be considered as a limitation.

| List of reference numerals: | |
|---|---|
| 100 | device |
| 101 | component part |
| 102 | base body |
| 103 | carrier element |
| 104 | transport coupling |
| 105 | support element |
| 106 | ground section |
| 107 | engagement opening |
| 108 | transport section |
| 201 | receiving section |
| 202 | receiving rail |
| 301 | receiving opening |
| 302 | first opening area |
| 303 | second opening area |
| 401 | mounting element |
| 402 | neck section |
| 403 | head section |
| 600 | handling system |
| 601 | base frame |
| 602 | attachment device |
| 603 | first guide structure |
| 604 | first guide carriage |
| 605 | controllable attachment element |
| 606 | second guide structure |
| 607 | second guide carriage |
| 608 | further attachment device |
| 609 | further first guide carriage |
| 610 | further second guide carriage |

-continued

| List of reference numerals: | |
|---|---|
| 611 | further attachment element |
| 612 | roller element |
| 613 | reinforcement bar |
| 701 | furnace base |
| 801 | guide cylinder |
| 901 | coupling element |
| 902 | furnace hood |
| 903 | further furnace hood |
| 904 | coupling area |
| 905 | further coupling area |
| 1201 | charging unit |
| 1301 | carrier tube |
| 1302 | carrier beam |
| 1303 | locking element |
| 1304 | guide rail |
| 1605 | transport device |
| 1701 | gripper unit |
| 1702 | gripper frame |
| 1703 | rod unit |
| 1704 | reinforcing beam |
| 1705 | rotation axis |
| 1706 | passage opening |

The invention claimed is:

1. Handling system for hood-type furnace, the handling system having:

a carrying device for carrying component parts to be temperature-controlled and a furnace hood, a transport device for transporting the carrying device, the transport device having a base frame which is transportable along a ground, and an attachment device, which is coupled to the base frame, wherein the attachment device is configured to selectively attach the carrying device to the base frame, wherein the base frame is configured such that the base frame is transportable for a transport of the carrying device between a set-up location, at which the carrying device is selectively attachable to the base frame, and a temperature-control location in the hood-type furnace; and wherein the carrying device is configured to carry component parts to be temperature-controlled that include coiled metal strips or metal wires, and wherein the carrying device comprises:

a base body, and a plurality of carrier elements, to which a component part is attachable, wherein each carrier element is detachably attached to the base body by a snap-in connection or a clamp connection, wherein each carrier element is a head stock, wherein the base body has a transport coupling, which is configured such that the transport coupling is detachably fixable to the attachment device, wherein each carrier element forms a carrier column, and wherein each carrier column is configured such that a component part can be placed over each carrier column.

2. Handling system according to claim 1, wherein the base frame is formed along a base plane, wherein the attachment device is movable perpendicularly to the base plane.

3. Handling system according to claim 2, wherein the transport device has at least one first guide structure, which is fixed to the base frame and extends perpendicularly to the base plane, wherein the attachment device has a first guide carriage, which is movably coupled to the at least one first guide structure, wherein the first guide carriage is selectively coupleable to the carrying device.

4. Handling system according to claim 3, wherein the first guide carriage has a controllable attachment element, wherein the controllable attachment element is movable into a release position, in which the carrying device is decoupled from the controllable attachment element, and is movable into a clamping position, in which the carrying device is coupled to the controllable attachment element.

5. Handling system according to claim 3, wherein the transport device has at least one second guide structure which is fixed to the base frame and extends perpendicular to the base plane, wherein the attachment device has a second guide carriage, which is movably coupled to the at least one second guide structure, wherein the second guide carriage is selectively coupleable to the carrying device, wherein the first guide carriage and the second guide carriage are arranged such that the guide carriages are opposite each other with respect to the carrying device.

6. Handling system according to claim 1, wherein the transport device has a further attachment device, wherein the further attachment device is movable perpendicularly to a base plane.

7. Handling system according to claim 6, wherein the further attachment device has a further first guide carriage, which is movably coupled to the at least one first guide structure, wherein the further first guide carriage is selectively coupleable to the carrying device or to a further carrying device.

8. Handling system according to claim 7, wherein the further attachment device has a further second guide carriage which is movably coupled to the at least one second guide structure, wherein the further second guide carriage is selectively coupleable to the carrying device or the further carrying device, wherein the further first guide carriage and the further second guide carriage are arranged such that the further guide carriages are opposite each other with respect to the carrying device.

9. Handling system according to claim 8, further having the further carrying device, which is formed as a guide cylinder and/or as a furnace hood, wherein the further carrying device is selectively coupleable to the further attachment device, wherein the carrying device, by the attachment device, and the further carrying device, by the further attachment device, are movable relative to each other.

10. Handling system according to claim 1, wherein the carrying device forms a gripper unit, to which a component part is selectively coupleable, wherein the gripper unit is selectively attachable to the base frame by the attachment device.

11. Handling system according to claim 1, wherein each carrier column has a carrier tube, onto which the component parts are pluggable, and a carrier beam, wherein the carrier beam is insertable into the carrier tube and is lockable to the carrier tube, wherein the carrier beam has a transport section for coupling to a transport device.

12. Handling system according to claim 1, wherein the base body has a bottom section, which is placeable on a ground, wherein the base body is configured such that a weight force of the component parts is passable into the ground via the base body.

13. Handling system according to claim 1, wherein each carrier element is suspendable from the base body for detachable attachment so that the carrier element extends from the base body towards the ground.

14. Handling system according to claim 1, wherein the base body has a receiving section, wherein each carrier element has an attachment element formed such that said attachment element is selectively fixable to said receiving section.

15. Handling system according to claim 14, wherein the receiving section has a receiving rail, wherein each carrier element has a gripping element, which is selectively fixable to the base body with the receiving rail for fixing the respective carrier element to the base body.

16. Handling system according to claim 14, wherein the receiving section has a receiving opening, wherein the attachment element has an attachment pin, which is attachable in the receiving opening, wherein the attachment pin has a neck section and a head section, wherein the head section has a larger diameter than the neck section, wherein the receiving opening has a first opening area and a second opening area, wherein the first opening area is larger than the diameter of the neck section and the head section, wherein the second opening area is larger than the diameter of the neck section and smaller than the diameter of the head section.

* * * * *